May 22, 1951          E. FIELD          2,553,646
ENDLESS TRACK OR CHAIN
Filed Oct. 14, 1948
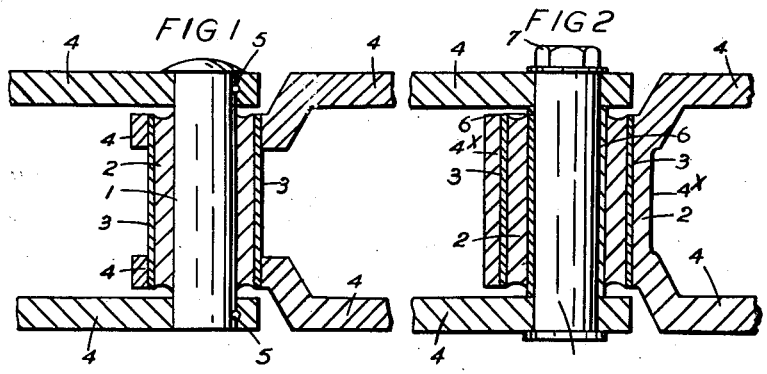
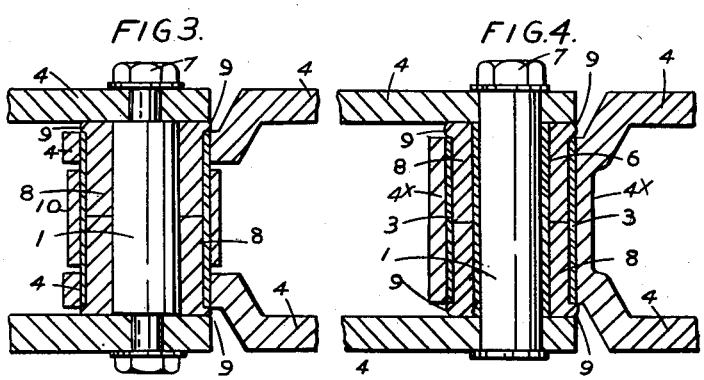
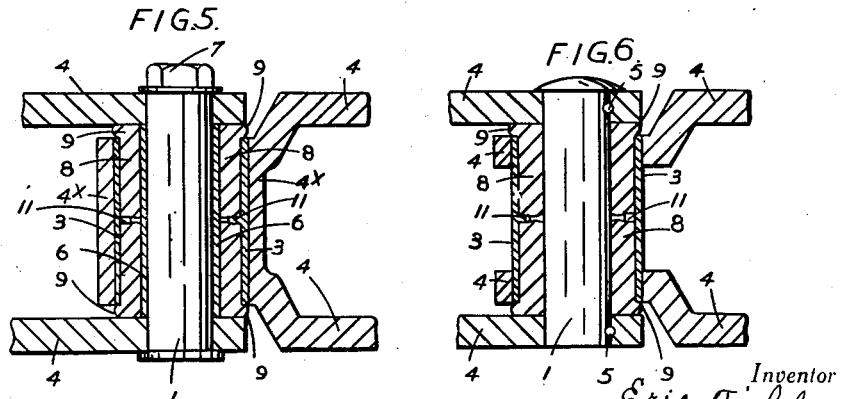
Inventor
Eric Field
By
Cushman, Darby & Cushman
Attorneys Patented May 22, 1951

2,553,646

UNITED STATES PATENT OFFICE 2,553,646

ENDLESS TRACK OR CHAIN

Eric Field, Colne, England

Application October 14, 1948, Serial No. 54,531
In Great Britain August 11, 1947

7 Claims. (Cl. 305—10)

This invention relates to endless tracks or chains and particularly to tracks as used on tracked vehicles or track laying vehicles.

As is well known in the case of such endless tracks the weakest part of the tracks are the track hinge pins and bushes. Since such tracks work under bad conditions, e. g. by being exposed to dirt and grit under load with no means of lubrication, whilst the hinge pins and bushes are rotating in relation to each other, these require to be made of good quality material with an accurate finish. Also the normal method of assembly necessitates expensive plant and does not lend itself to field repair work.

It is therefore the object of this invention to eliminate the wear that takes place in the normal or well known types of pins and bushes of endless tracks.

A further object is to effect a saving in the cost of manufacture and to facilitate field repair work.

A still further object is to provide a new or improved construction of endless track which has a resistance to reverse bending and thereby the advantages of a semi-rigid girder type of track.

According to the invention, in a track or chain of the type described, there is provided at each joint of adjacent links a bush or bushes of resilient material interposed between each link pivot pin and the adjacent connected link in such a manner that angular movement between links is absorbed in the resilient material by torsional elasticity.

By fitting a bushing in this manner the metallic contact between the pin and link or roller, as in the well known type of track is avoided.

The resilient bush may take one of several forms as will be hereinafter set forth.

In order that the invention may be clearly understood and readily carried into effect the same will now be more fully described with reference to and by the aid of the accompanying drawings, wherein—

Figure 1 is a fragmentary section showing one construction wherein the resilient material is mounted directly on the track pin.

Figure 2 is a similar view to Figure 1 but showing a sleeve interposed between the resilient material and the track pin.

Figures 3, 4, 5 and 6 are similar views to Figures 1 and 2 but showing modified constructions.

Referring to Figure 1, the bush assembly consists of an inner spindle or tube 1 and a resilient bush 2 compressed into the annular space between the inner spindle or tube 1 and an outer tube 3, each track or chain link 4 having an inner spindle 1 secured to one end and an outer tube 3 integral with or secured at the other end, and thus in a complete track or chain an above-mentioned bush assembly occurs at each of the joints of adjacent links 4.

The inner spindle or tube 1 may be secured to the track or chain link 4 as by cotter pins 5, by press fit or other well-known means, whilst the outer tube 3 may form part of the track or chain link 4 or be secured thereto by press fit or other well-known means.

The resilient bush 2 may be bonded to the outer tube 3 and also to the inner spindle or tube 1, if desired, the outer tube 3 being the portion of each link 4 engaged by the teeth of the track driving sprocket (not shown).

Thus it will be seen that angular movement between adjacent links 4 about the spindle or tube 1 will be absorbed in the resilient bush 2 by torsional elasticity. In the construction illustrated in Figure 2, the resilient bush 2 is compressed or bonded between the outer tube 3 and an inner bush tube 6, the outer tube 3 being secured to the track or chain link by press fit or other means and adjacent links being connected together by means of the inner spindle 1 passing through the arms of one link and through the inner bush tube 6 of the other link, the spindle 1 clamping together the arms of the link and the inner bush tube 6 by means of the nut 7.

With this construction each link 4 can be a unit casting, forging or fabrication, and includes at $4^x$ the portion of each link engaged by the teeth of the driving sprocket (not shown).

In the construction illustrated in Figure 3 the bush assembly comprises two aligned resilient bushes 8, bonded or compressed between the outer tube 3 and the inner spindle 1, said resilient bushes 8 having pre-formed flanges at 9 which abut against the inner sides of the arms of a link 4, the nuts 7 clamping the arms and spindle 1 together. A further bush or roller 10 encircles the tube 3, and this bush 10 is engaged by the teeth of the driving sprocket (not shown).

Figure 4 illustrates a similar construction to that shown in Figure 2, aligned resilient bushes 8 with pre-formed flanges 9 replacing the single resilient bush 2 of Figure 2.

Figure 5 illustrates a similar construction to that shown in Figure 4 except that the two resilient bushes 8 are compressed or bonded into the annular space between the inner bush tube 6 and the outer tube 3 which has a flange 11 on its inner surface, centrally thereof at the junction of the two resilient bushes 8.

Figure 6 illustrates a similar construction to that shown in Figure 1, aligned resilient bushes 8 with pre-formed flanges at 9 replacing the single resilient bush 2 of Figure 1, and the flange 11 being provided on the inner surface of the tube 3.

The opposed pairs of links 4 are each compressed toward each other and provide a resilient contact or engagement between the inside and outside of the adjacent connected links. Thus, each of the resilient bushes 2 is compressed to a fixed minimum distance which is shown in Figure 3 by the stepped pin 1; in Figures 4 and 5 by the bush tube 6, and in Figure 6 by the collar 5.

Instead of the teeth of the track or chain driving sprocket (not shown) engaging portions of the links of the track or chain, as hereinbefore described and referenced 3, 4ˣ and 9 in alternative constructions shown in the drawings, each link may be provided with a tooth or projection (not shown) engaged by rollers on the driving sprocket.

It will be appreciated that any of the above forms or methods of construction can be used to give a semi-rigid girder track or chain. By this is meant the following:

When a normal or pin-jointed track is used, the links have free movement about the hinge pins, allowing the track to adjust itself to the irregularities of the ground contacted. The normal weight carrying wheels which carry the vehicle weight to the track do not usually overlap, resulting in the ground pressure on the track being greatest directly under the points of contact of the weight carrying wheels, the track and the ground, and smaller or zero between the wheels. Furthermore the track links, being freely pivoted together, are subject to pivoting in the reverse direction, relative to each other, to the direction of relative pivoting between them as they traverse the aforesaid wheels.

In accordance with the present invention and above described methods of track construction, the resilient bushes have torsional stiffness and will tend to resist the reverse pivoting of the track links which tends to occur between the weight carrying wheels, and according to the relative position of the track links when the resilient bushes are initially assembled this resistance can be increased, with the result that the track would be flat or nearly so under the vehicle load, and would have great resistance to reverse pivoting of the links, e. g. if the track were initially assembled in the form of a curve, when in use the resilient bushes will have torsional resistance to reverse pivoting of the links, and would resist flattening of the track.

The above described constructions of resilient bush could be used equally well in connection with chains, e. g. conveyor chain, where here again metallic wear occuring in the pivot pins and bushes of the chain connections could be eliminated by the invention, and the torsional resistance to reverse pivoting of the links could be utilised to oppose sagging in the carrying run of a conveyor chain, or conveyor belt carried by a chain, due to its own weight and a conveyed load, with the result that the number of supporting rollers normally required to support such a carrying run can be considerably reduced.

I claim:

1. An endless track or chain of the class described including a series of interconnected links arranged in parallel spaced pairs, each pair of links being spaced at one end and having aligned transverse openings, the opposite ends of each pair of links having reduced spaced end portions provided with transverse aligned openings extending between the spaced ends of the links so as to register with the openings therein, a pivot pin extending through said openings for connecting adjacent links together, a transverse outer tube mounted in the walls of the openings of the reduced end portions, said outer tube being spaced from the sides of the adjacent link and from said pivot pin, resilient bush means compressed between said pivot pin and said outer tube, said resilient bush means having preformed annular flanges extending between the ends of the outer tube and the adjacent inner sides of the links to provide a resilient non-metal contact between the inner and outer sides of adjacent connected links, and means for compressing the resilient bush means to a fixed minimum distance.

2. An endless track or chain of the class described including a series of interconnected links arranged in parallel spaced pairs, each of said pairs of links having aligned transverse openings at one end thereof, the opposite ends of each pair of links having reduced end portions provided with transverse aligned openings extending between adjacent pairs of links so as to register with the openings therein, a transverse outer tube mounted in the walls of the openings of the reduced end portions, a pivot pin extending through said openings for connecting adjacent links together, an inner transverse tube concentrically spaced from said outer tube and abutting the inner sides of adjacent pairs of links, said pivot pin extending transversely through said inner tube, a resilient bush compressed between said inner and outer tubes, said resilient bush having preformed annular flanges extending between the ends of the outer tube and the adjacent inner sides of the links to provide a resilient non-metal contact between the inner and outer sides of adjacent connected links, the abutting engagement of said inner tube with said links constituting means for compressing the resilient bush to a fixed minimum distance.

3. An endless track or chain as called for in claim 1 in which the pivot pin has reduced ends extending through the openings in said pair of links and forming shoulder portions engaging the adjacent inner walls of the links so as to provide means for compressing the resilient bush to a fixed minimum distance.

4. An endless track or chain as called for in claim 1 in which cotters lock the pivot pin to the walls of adjacent openings in the links so as to provide means for compressing the resilient bush to a fixed minimum distance.

5. An endless track or chain as called for in claim 1 in which said resilient bush means is formed with two axially aligned sections.

6. An endless track or chain as called for in claim 2 in which said resilient bush is formed with two axially aligned sections, and said outer tube having a radially inwardly extending annular lug engaging the inner opposite ends of the sections of said resilient bush.

7. An endless track or chain as called for in claim 2 in which said resilient bush is formed of two axially aligned sections, and said outer tube has a radially inwardly extending annular lug centrally thereof engaging the inner opposite ends of the sections of said resilient bush.

ERIC FIELD.

REFERENCES CITED

The following references are of record in the file of this patent:

UNITED STATES PATENTS

| Number | Name | Date |
|---|---|---|
| 1,913,098 | Alden | June 6, 1933 |
| 1,970,568 | Knox | Aug. 21, 1934 |
| 1,973,214 | Lamb | Sept. 11, 1934 |